United States Patent
Eizips et al.

(10) Patent No.: US 11,429,123 B2
(45) Date of Patent: *Aug. 30, 2022

(54) SYSTEM AND METHOD FOR ARC DETECTION AND INTERVENTION IN SOLAR ENERGY SYSTEMS

(71) Applicant: Tigo Energy, Inc., Campbell, CA (US)

(72) Inventors: Daniel Eizips, Sunnyvale, CA (US); Shmuel Arditi, Discovery Bay, CA (US)

(73) Assignee: Tigo Energy, Inc., Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/001,485

(22) Filed: Aug. 24, 2020

(65) Prior Publication Data

US 2021/0026382 A1      Jan. 28, 2021

Related U.S. Application Data

(63) Continuation of application No. 15/933,861, filed on Mar. 23, 2018, now Pat. No. 10,754,365, which is a continuation of application No. 14/718,426, filed on May 21, 2015, now Pat. No. 9,927,822, which is a continuation of application No. 13/075,093, filed on Mar. 29, 2011, now Pat. No. 9,043,039.

(60) Provisional application No. 61/446,440, filed on Feb. 24, 2011.

(51) Int. Cl.
| | | |
|---|---|---|
| *G05B 23/02* | (2006.01) | |
| *G05F 1/02* | (2006.01) | |
| *H02S 50/10* | (2014.01) | |
| *H02S 10/10* | (2014.01) | |
| *G05B 15/02* | (2006.01) | |

(52) U.S. Cl.
CPC .............. *G05F 1/02* (2013.01); *G05B 15/02* (2013.01); *G05B 23/0218* (2013.01); *H02S 10/10* (2014.12); *H02S 50/10* (2014.12)

(58) Field of Classification Search
None
See application file for complete search history.

(56) References Cited

U.S. PATENT DOCUMENTS

| | | |
|---|---|---|
| 5,235,266 A | 8/1993 | Schaffrin |
| 5,268,832 A | 12/1993 | Kandatsu |
| 5,289,998 A | 3/1994 | Bingley et al. |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

(Continued)

*Primary Examiner* — Jason Lin
(74) *Attorney, Agent, or Firm* — Greenberg Traurig

(57) ABSTRACT

An arc detection and intervention system for a solar energy system. One or more arc detectors are strategically located among strings of solar panels. In conjunction with local management units (LMUs), arcs can be isolated and affected panels disconnected from the solar energy system.

20 Claims, 5 Drawing Sheets

(56) References Cited

U.S. PATENT DOCUMENTS

| | | | |
|---|---|---|---|
| 5,604,430 A | 2/1997 | Decker et al. | |
| 5,923,158 A | 7/1999 | Kurokami et al. | |
| 5,963,406 A | 10/1999 | Neiger et al. | |
| 6,275,016 B1 | 8/2001 | Ivanov | |
| 6,433,978 B1 | 8/2002 | Neiger et al. | |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,984,970 B2 | 1/2006 | Capel | |
| 7,061,214 B2 | 6/2006 | Mayega et al. | |
| 7,248,946 B2 | 7/2007 | Bashaw et al. | |
| 7,253,640 B2 | 8/2007 | Engel et al. | |
| 7,256,566 B2 | 8/2007 | Bhavaraju et al. | |
| 7,276,886 B2 | 10/2007 | Kinder et al. | |
| 7,518,346 B2 | 4/2009 | Prexl et al. | |
| 7,595,616 B2 | 9/2009 | Prexl et al. | |
| 7,605,498 B2 | 10/2009 | Ledenev et al. | |
| 7,719,140 B2 | 5/2010 | Ledenev et al. | |
| 7,952,233 B2 * | 5/2011 | Bayley | E03C 1/057 307/71 |
| 8,046,101 B2 * | 10/2011 | Hisatani | F24S 40/20 700/248 |
| 9,043,039 B2 | 5/2015 | Eizips et al. | |
| 9,927,822 B2 | 3/2018 | Eizips et al. | |
| 10,754,365 B2 | 8/2020 | Eizips et al. | |
| 2001/0023703 A1 * | 9/2001 | Kondo | H01L 31/02021 136/244 |
| 2002/0053914 A1 | 5/2002 | Dring et al. | |
| 2002/0130668 A1 | 9/2002 | Blades | |
| 2003/0151414 A1 | 8/2003 | Shea | |
| 2004/0136124 A1 | 7/2004 | Engel et al. | |
| 2005/0057214 A1 | 3/2005 | Matan | |
| 2005/0057215 A1 | 3/2005 | Matan | |
| 2005/0213272 A1 * | 9/2005 | Kobayashi | H02J 3/385 361/62 |
| 2006/0001406 A1 | 1/2006 | Matan | |
| 2006/0174939 A1 | 8/2006 | Matan | |
| 2006/0185727 A1 | 8/2006 | Matan | |
| 2007/0135970 A1 * | 6/2007 | Zhou | H02J 3/383 700/286 |
| 2007/0273351 A1 | 11/2007 | Matan | |
| 2008/0121272 A1 | 5/2008 | Besser et al. | |
| 2008/0122449 A1 | 5/2008 | Besser et al. | |
| 2008/0122518 A1 | 5/2008 | Besser et al. | |
| 2008/0147335 A1 * | 6/2008 | Adest | G01R 21/133 702/64 |
| 2008/0179949 A1 | 7/2008 | Besser et al. | |
| 2008/0191560 A1 | 8/2008 | Besser et al. | |
| 2008/0191675 A1 | 8/2008 | Besser et al. | |
| 2008/0303503 A1 | 12/2008 | Wolfs | |
| 2009/0154033 A1 | 6/2009 | Tomimbang | |
| 2010/0085670 A1 | 4/2010 | Palaniswami et al. | |
| 2011/0090089 A1 | 4/2011 | Luo | |
| 2011/0267721 A1 | 11/2011 | Chaintreuil et al. | |
| 2011/0301772 A1 | 12/2011 | Zuercher et al. | |
| 2012/0174961 A1 | 7/2012 | Larson et al. | |
| 2012/0253533 A1 | 10/2012 | Eizips et al. | |
| 2013/0307556 A1 | 11/2013 | Ledenev et al. | |
| 2015/0253788 A1 | 9/2015 | Eizips et al. | |
| 2018/0210476 A1 | 7/2018 | Eizips et al. | |

FOREIGN PATENT DOCUMENTS

| | | |
|---|---|---|
| DE | 19961705 | 7/2001 |
| EP | 1388774 | 2/2004 |
| ES | 2249147 | 3/2006 |
| WO | 2003012569 | 2/2003 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronics, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Eurosun 96, pp. 819-824, Sep. 16, 1996.

Roman, Eduardo, et al., "Intelligent PV Module for Grid-Connected PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

SYSTEM AND METHOD FOR ARC DETECTION AND INTERVENTION IN SOLAR ENERGY SYSTEMS

RELATED APPLICATIONS

The present application is a continuation application of U.S. patent application Ser. No. 15/933,861, filed Mar. 23, 2018, issued as U.S. Pat. No. 10,754,365 on Aug. 25, 2020, and entitled "System and Method for Arc Detection and Intervention in Solar Energy Systems," which is a continuation application of U.S. patent application Ser. No. 14/718,426, filed May 21, 2015, issued as U.S. Pat. No. 9,927,822 on Mar. 27, 2018, and entitled "System and Method for Arc Detection and Intervention in Solar Energy Systems," which is a continuation application of U.S. patent application Ser. No. 13/075,093, filed Mar. 29, 2011, issued as U.S. Pat. No. 9,043,039 on May 26, 2015, and entitled "System and Method for Arc Detection and Intervention in Solar Energy Systems," which claims the benefit of Prov. U.S. Pat. App. Ser. No. 61/446,440, filed Feb. 24, 2011, and entitled "System and Method for Arc Detection and Intervention in Large Solar Energy Systems," the entire disclosures of which applications are incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

FIELD OF THE TECHNOLOGY

This disclosure relates to various embodiments of solar energy systems and more particularly to the detection of arcs within photovoltaic panels and the isolation and disconnection of these panels from the systems.

BACKGROUND

Solar energy systems are often plagued by arcing. In most cases, the arcing occurs inside the solar panels. This problem can affect the performance and safety of the whole system, and it can even lead to shut-offs due to sporadic short circuits. Arcing often occurs when solar panels have become cracked or damaged, permitting water to leak into the panel. The presence of water may cause a short circuit of the silicon wafers to the frame or to the underlying structure, resulting in arcing. What is needed is a system and method by which an arc can be found and isolated from the rest of the system, hence improving system performance and reducing safety risks such as the risk of fire.

SUMMARY OF THE DESCRIPTION

Embodiments of an arc detection and intervention system for a solar energy system are disclosed. One or more arc detectors are strategically located among strings of solar panels. In conjunction with system management units and local management units (LMUs), arcs can be isolated and affected panels disconnected from the solar energy system.

These and other objects and advantages will become clear to those skilled in the art in view of the description of the best presently known mode of carrying out the inventions and the industrial applicability of the preferred embodiment as described herein and as illustrated in the figures of the drawings.

BRIEF DESCRIPTION OF THE DRAWINGS

The purposes and advantages of presented inventions will be apparent from the following detailed description in conjunction with the appended figures of drawings, in which.

In the various figures of the drawings, like references are used to denote like or similar elements or steps.

DETAILED DESCRIPTION

In the following description and in the accompanying drawings, specific terminology and drawing symbols are set forth to provide a thorough understanding of the present invention. In some instances, the terminology and symbols can imply specific details that are not required to practice the invention.

Figure 1:
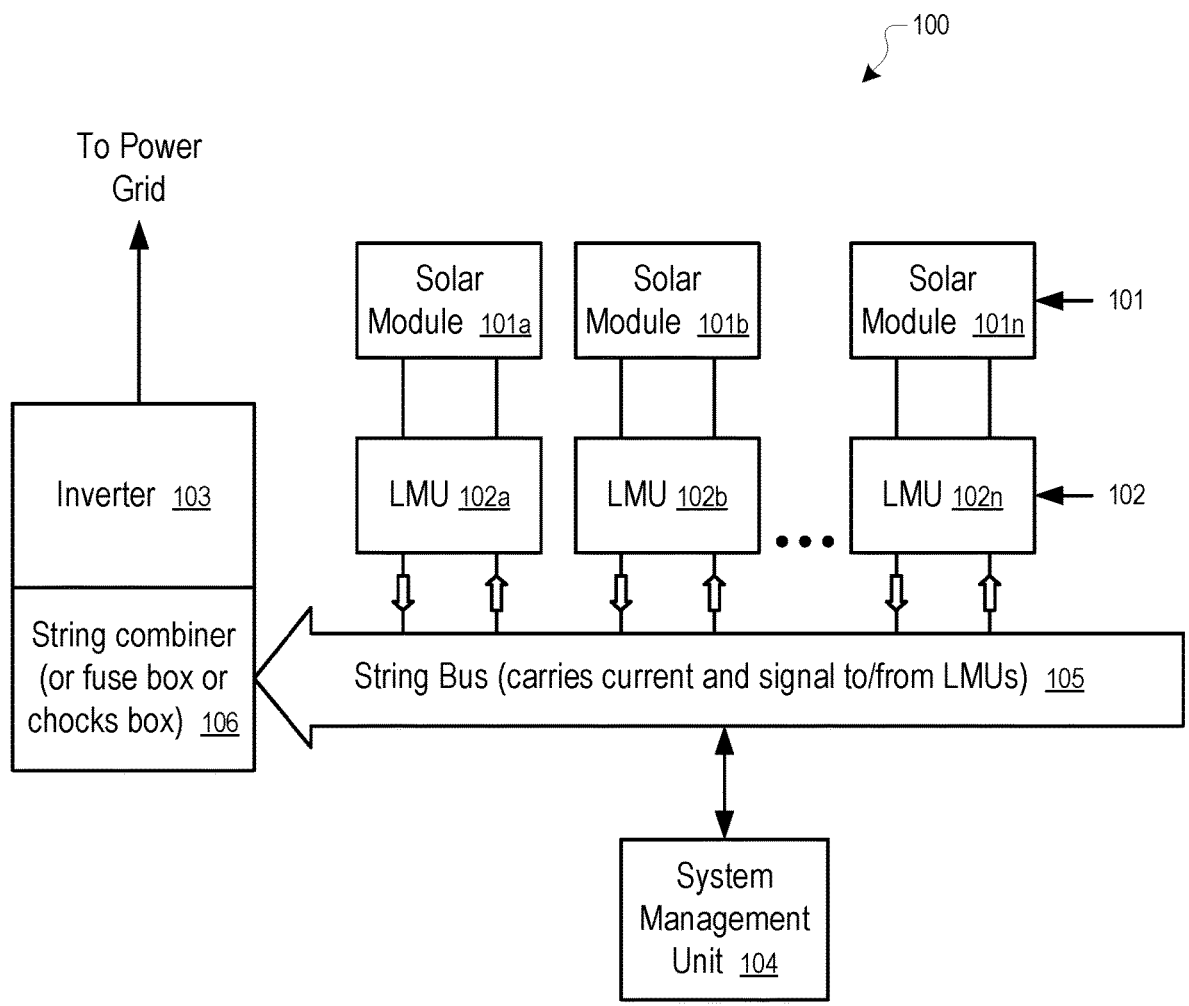
FIG. 1 shows a representative photovoltaic system.

FIG. 1 illustrates a representative photovoltaic system 100, according to one aspect of the system and method disclosed herein. Photovoltaic system 100 is built from a few components, including photovoltaic modules 101a, 101b . . . 101n, local management unit units 102a, 102b . . . 102n, an inverter 103, and system management unit 104.

In one approach, the system management unit 104 is part of the inverter 103, the combiner box 106, local management units 102, or a stand-alone unit. The solar modules 101a, 101b . . . 101n are connected in parallel to the local management units 102a, 102b . . . 102n respectively, which are connected in series to form a string bus 105, which eventually is connected to an inverter 103 and the system management unit 104.

In FIG. 1, the string bus 105 can be connected to the inverter 103 directly or as part of a mesh network or combiner boxes or fuse boxes (not shown). An isolated local management unit can be used as a combiner box 106 to adjust all voltages before connecting to the inverter 106; or, a single or multi-string inverter can be used. To limit the changes in the voltage of the bus, the system management unit 104 may assign a different phase for each of the local management units 102a, 102b . . . 102n. In one approach, at any given time, a maximum of a predetermined number of solar modules 101 (i.e., one single solar panel) are disconnected from the string bus 105.

In one approach, beyond the panel connection, the local management units can have the signal inputs (not shown), including but not limited to duty cycle, phase, and synchronization pulse (for example, to keep the local management units synchronized). In one approach, the phase and the synchronization pulse are used to further improve performance, but the local management units 102 can work without them.

In one approach, the local management units may provide output signals. For example, the local management units 102 may measure current and voltage at the module side and optionally measure current and voltage in the string side. The local management units 102 may provide other suitable signals, including but not limited to measurements of light, temperature (both ambient and module), etc.

In one approach, the output signals from the local management units 102 are transmitted over a power line (for example, via a power line communication (PLC)), or transmitted wirelessly.

In one approach, the system management unit 104 receives sensor inputs from light sensor(s), temperature sensor(s), one or more each for ambient, solar module or both, to control the photovoltaic system 100. In one approach, the signals may also include synchronization signals. For example, using the described methods, the local management unit can be a non-expensive and reliable device that can increase the throughput of a photovoltaic solar system by a few (for example, single or low double digits) percentage points. These varied controls also allow installers using this type of system to control the VOC (open circuit voltage) by, for example by shutting off some or all modules. For example, by using the local management units 102 of the system 100, a few modules can be disconnected from a string if a string is approaches the regulatory voltage limit, permitting more modules to be installed in a string.

In some approaches, local management units 102 can also be used within the solar panel to control the connection of solar cells attached to strings of cells within the solar panel.

Figure 2:
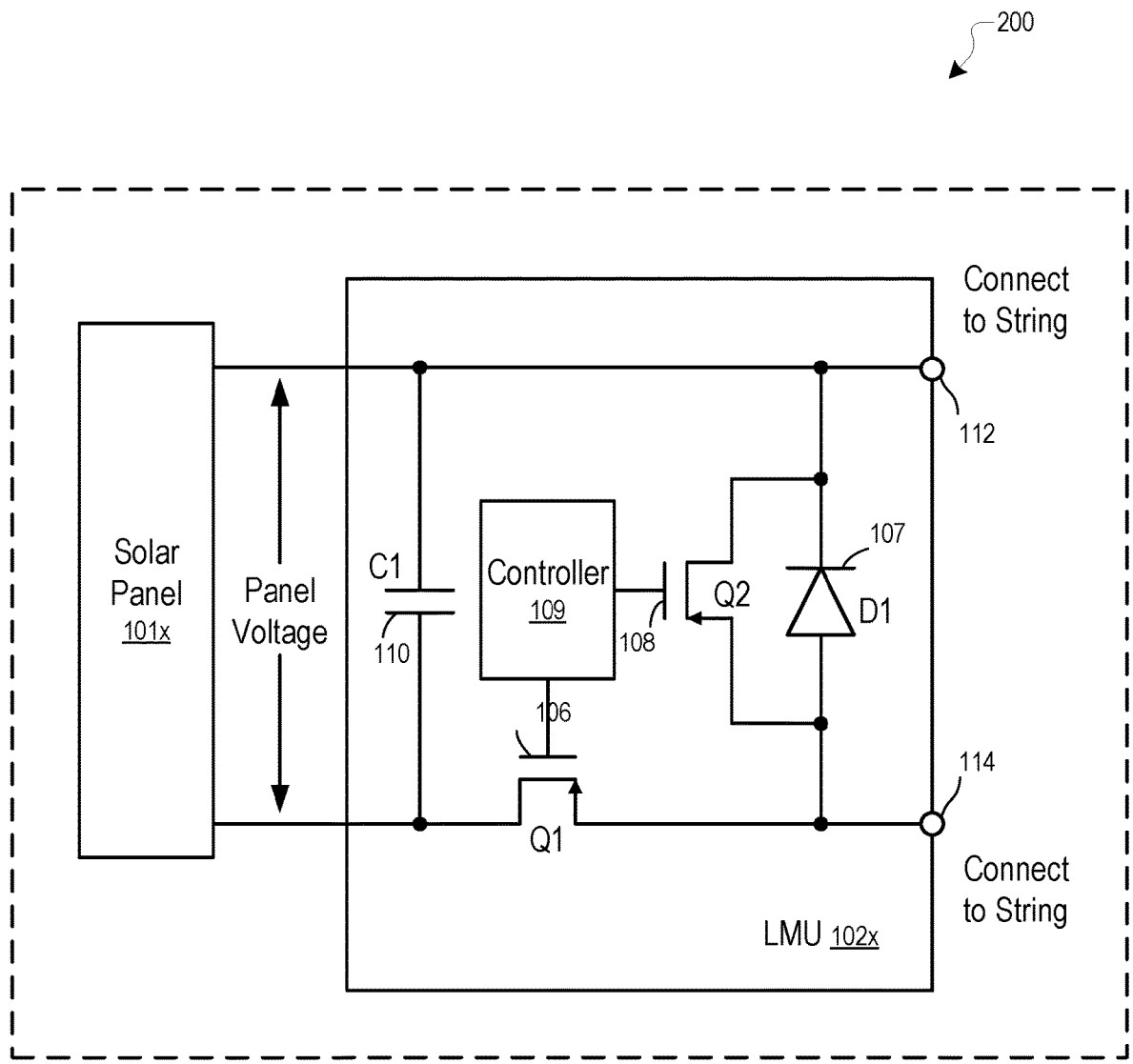
FIG. 2 shows the interior of a representative enhanced photovoltaic panel.

FIG. 2 shows the interior of a representative enhanced solar panel 200, according to one aspect of the system and method disclosed herein, with standard solar module 101$x$ and local management unit (LMU) 102$x$. LMU 102$x$ can be integrated into a junction box (Jbox) or, in some cases, into the panel 200 itself. LMU 102$x$ provides two connectors 112 and 114 for serial connections with other local management units 102 to connect to string bus 105. The controller 109 controls the states of the switches Q1 106 and Q2 108. When the controller 109 turns on the switch 106, the module voltage and the capacitor C1 110 are connected in parallel to the connectors 112 and 114. The output voltage between the connectors 112 and 114 is substantially the same as the output panel voltage. During the period the switch 106 is turned off (open), the controller 109 turns on (closes) the switch 108 to provide a path around diode D1 107 to improve efficiency. While the switch 106 is open, the panel voltage charges the capacitor C1 110, such that when the switch 106 is open, both the solar module 101$x$ and the capacitor 110 provide current going through the connectors 112 and 114, allowing a current larger than the current of the solar panel 200 to flow in the string (the string bus 105). When the switch 106 is open, the diode D1 107 also provides a path between the connectors 112 and 114 to sustain current in the string, even if the switch 108 is open for some reason.

In one approach, the controller 109 is connected (not shown in FIG. 2) to the panel voltage to obtain the power for controlling the switches Q1 106 and Q2 108. In one approach, the controller 109 is further connected (not shown in FIG. 2) to at least one of the connectors to transmit and/or receive information from the string. In one approach, the controller 109 includes sensors (not shown in FIG. 2) to measure operating parameters of the solar panel, such as panel voltage, panel current, temperature, light intensity, etc.

Figure 3:
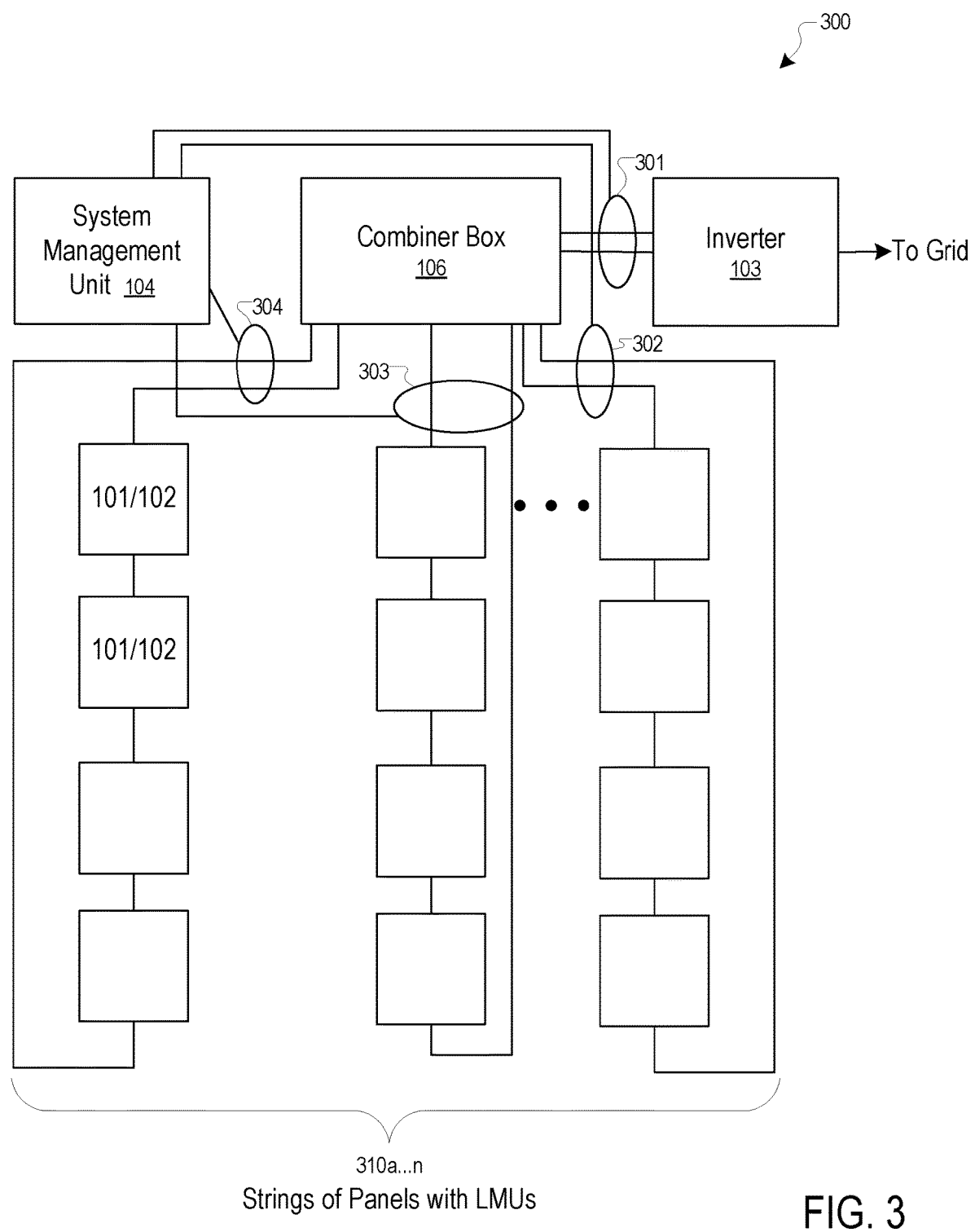
FIG. 3 shows an overview of an photovoltaic system.

FIG. 3 shows an overview of a representative system 300, according to one aspect of the system and method disclosed herein. System 300 has system management unit 104 and multiple strings 310$a$-$n$, each string containing multiple panels 101 with associated LMUs 102. Additionally, arc detectors such as, for example, 301, 302, 303, and 304 are inserted into system 300. In some cases, only a single arc detector 301 is included in the entire system 300, and the location of a problem is determined by turning individual units on and off, as described later. In other cases, however, to speed up the process of arc detection, each string 310$a$-$n$ may have its own associated arc detector. In some cases, in system 300, multiple combiner boxes 106 may feed into a single inverter 103, so different locations in the wiring of the system can be chosen for the location of the arc detector(s), depending on the design of the specific system.

Figure 4:
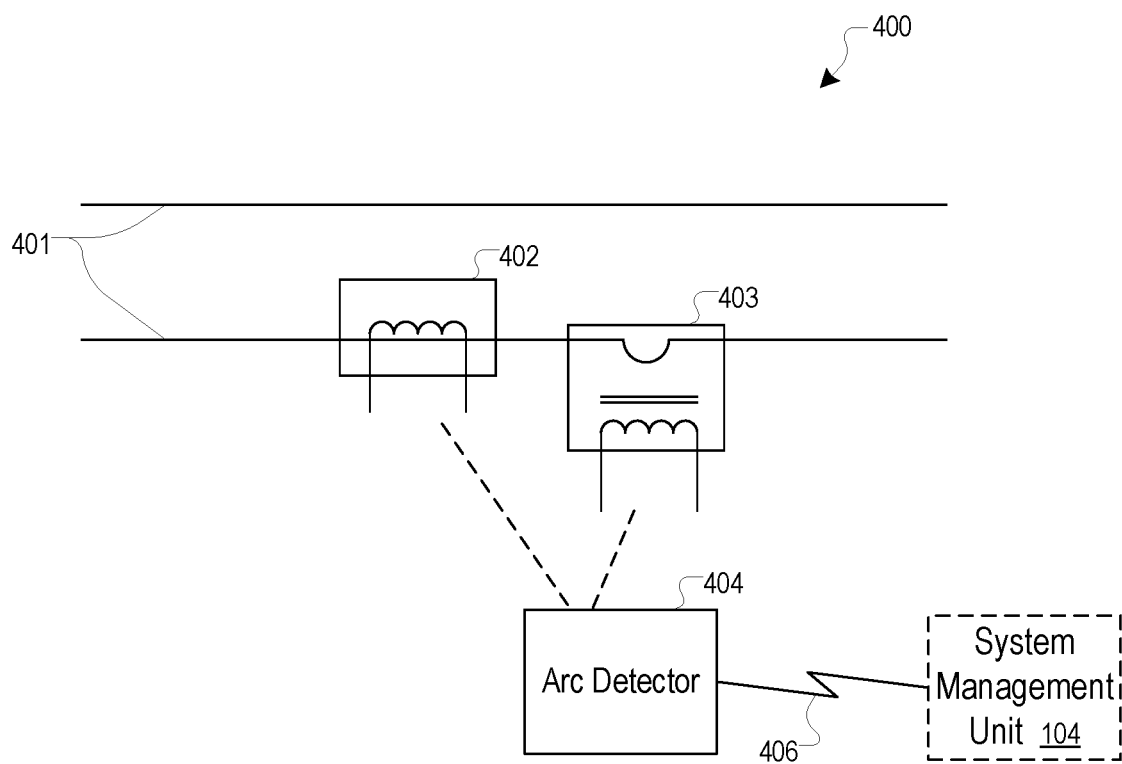
FIG. 4 shows a detailed view of a representative arc detector.

FIG. 4 shows a more detailed view of a representative arc detector 400, according to the system and method disclosed herein. Arc detector 400 is just one example of a suitable device for arc detectors 301, 302, 303, and 304. Typically, one of two main approaches is taken. A coupling device such as device 402 or device 403 may be inserted in the wiring 401 of system 400. Device 402 is a Rogowski coil, a type of transformer that may be clipped onto a wire, wherein the unbroken wire forms the primary winding. Device 403 is a standard type of transformer that requires that the wire be cut and the device inserted into the circuit. Both devices 402 and 403 deliver an output signal to a circuit 405 of arc detector box 404. Many such detector boxes 404 are currently known in the art; see, for example, U.S. Pat. Nos. 6,683,766, 5,629,824, 5,619,105, 5,280,404, and 5,121,282 that describe some of many possible various types of arc detection circuits. In some cases, a capacitive coupling is used to look for broad band noise that often accompany arcs. In particular, all such devices look for unusual behavior in either voltage changes or changes of frequency spectrum, and consider these changes as indicators of the presence of arcing. The arc detection circuit then communicates via link 406 to the system management unit 104, signaling that the detector 404 has detected an arc. System management unit 104, in response to the signal from detector 404, then initiates a test, which is described below in the discussion of FIG. 5. For the purposes of the system and method described herein, no particular type should be considered better than any other type, as long as it has the capability to detect arcing in a dc circuit, as it is used herein.

Figure 5:
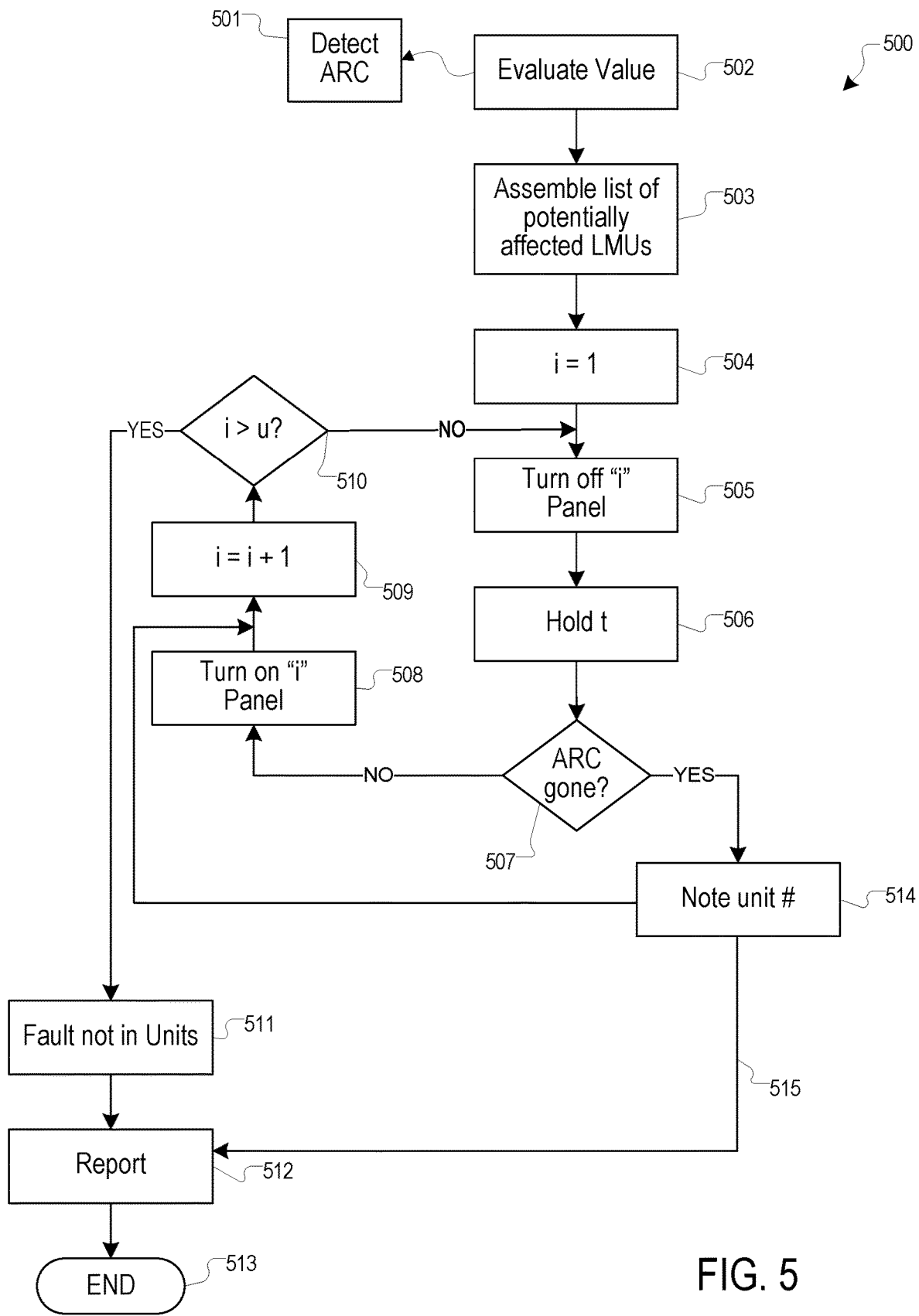
FIG. 5 shows a testing process for detecting arcs within photovoltaic system.

FIG. 5 shows a representative testing process 500 for detecting arcs within a solar energy system, according to one aspect of the system and method disclosed herein. At point 501, the system receives a signal indicating detection of an arc and initiates the test. At step 502, the system evaluates the signal value; for example, depending on the arc detection circuitry employed, different types of arcs and different strengths or danger levels may be indicated, rather than simply the possible presence of an arc. In step 503, the system assembles a list of potentially affected panels, including the LMU numbers.

As described above, in the discussion of FIG. 3, if arc detectors are attached individually to each of strings 310$a$-$n$, then only panels in the indicated string require testing. However, if the arc detection device is attached to combiner box 106, then all panels in all the strings connected to the combiner box 106 must be tested. In step 504, the system increments the unit count i to 1 and, in step 505, turns the panel off. In step 506, the system holds the unit in an off state for a duration t, and upon the completion of duration t, in step 507, the system checks to determine whether the arcing signal has ceased. If the signal has not ceased, the system moves to step 508, where it turns on panel i, and then to step 509, where it increments the unit count i to i+1.

In step 510, the system determines whether the current count i is greater than the number of panels u. If, at step 510, the system determines that i is less than u, the system loops back to step 505 and executes the test on the next panel. If, at step 510, the testing has reached a point where i is equal to or greater than u, the system concludes 511 that the problem lies outside the panels, perhaps in the wiring. In step 512, the system compiles a report and sends it to an energy system service monitoring company, and in step 513, the test ends. If, at step 507, the system determines that the arcing signal has ceased after testing a panel, the system notes the panel number, which it sends to the report compiler in step 512, and then the process loops back to step 509, where the unit number is incremented and the testing continued, in case some other units are also arcing.

Depending on the topology of system 300, in some cases an LMU may have at least one additional switch (on line 112 opposite Q1, not shown) in the LMU 102x shown in FIG. 2 allowing to completely disconnect the solar module 101x from the string bus 105 (respectively connections 112 and 114) to completely insulate the solar cells from the string. In other cases, there may be only a single switch, which in some cases may not permit complete insulation, requiring that the whole string be turned off at the combiner box, for example, for safety reasons. At the same time, the system can notify the service company, which can then deliver and install a replacement panel in a very short time, reducing the energy system down-time dramatically.

In the foregoing specification and the following appended documents, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

While the particular system, apparatus, and method for arc detection and Intervention as herein shown and described in detail, is fully capable of attaining the above-described objects of the inventions, it is to be understood that it is the presently preferred embodiment of the present inventions, and is thus representative of the subject matter which is broadly contemplated by the present inventions, that the scope of the present inventions fully encompasses other embodiments which can become obvious to those skilled in the art, and that the scope of the present inventions is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present inventions, for it to be encompassed by the present claims. Furthermore, no element, component, or method step in the present disclosure is intended to be dedicated to the public, regardless of whether the element, component, or method step is explicitly recited in the claims.

What is claimed is:

1. A system, comprising:
    a plurality of devices, each respective device in the plurality of the devices having:
        a switch to control output of electricity generated by a respective photovoltaic panel to which the respective device is locally coupled, and
        a controller to transmit and receive information; and
    a computing apparatus in communication with controllers in the plurality of devices and in communication with a detector in a photovoltaic system having photovoltaic panels controlled by the plurality of the devices;
    wherein in response to the detector detecting unusual behavior in the photovoltaic system, the computing apparatus communicates with the controllers to change operations of the photovoltaic panels and identifies a location of the unusual behavior within the photovoltaic system based on responses of the detector as results of changes in the operations of the photovoltaic panels.

2. The system of claim 1, wherein the changes in the operations of the photovoltaic panels include turning off output of a subset of the photovoltaic panels to cause the detector to report absence of unusual behavior in the photovoltaic system.

3. The system of claim 2, wherein output of the subset of the photovoltaic panels is turned off for a predetermined period of time in accordance with communications between the computing apparatus and the controllers; and unusual behavior results of the detector during the predetermined period of time are used to infer the location of the unusual behavior.

4. The system of claim 1, wherein the changes in the operations of the photovoltaic panels include turning off output of the photovoltaic panels one at a time to identify a photovoltaic panel turning off which causes the detector to report a change in detection results in the photovoltaic system.

5. The system of claim 4, wherein the computing apparatus infers the location of the unusual behavior based on the change in detection results in the photovoltaic system.

6. The system of claim 1, wherein the changes in the operations of the photovoltaic panels include turning off output of the photovoltaic panels one subset at a time; and the computing apparatus infers the location of the unusual behavior based on correlations between changes in detection results of the detector and the changes in the operations of the photovoltaic panels.

7. The system of claim 1, further comprising:
    the detector, wherein the unusual behavior is detected based on a signal in a set of wires in the photovoltaic system, wherein the signal corresponds to one or more of a voltage change and a frequency spectrum change.

8. The system of claim 7, wherein the unusual behavior is representative of broad band noise that accompanies an arc.

9. The system of claim 7, wherein the unusual behavior indicates presence of an arc.

10. A method, comprising:
    controlling, by a plurality of devices, a plurality of photovoltaic panels, wherein each respective device in the plurality of the devices has:
    a switch to control output of electricity generated by a respective photovoltaic panel to which the respective device is locally coupled, and
    a controller to transmit and receive information; and
    communicating, by a computing apparatus, with the controllers in the plurality of devices and with a detector in a photovoltaic system having the photovoltaic panels controlled by the plurality of the devices; and
    detecting, by the detector, a presence of unusual behavior in the photovoltaic system,
    in response to the detector detecting the presence of the unusual behavior in the photovoltaic system:
    instructing, by the computing apparatus via the communicating, the controllers to change operations of the photovoltaic panels;

receiving, in the computing apparatus via the communicating, detecting results from the detector responsive to changes in the operations of the photovoltaic panels; and identifying, by the computing apparatus, a location of the unusual behavior within the photovoltaic system based on changes in the detecting results responsive to the changes in the operations of the photovoltaic panels.

11. The method of claim 10, wherein the changes in the operations of the photovoltaic panels include turning off output of a subset of the photovoltaic panels to cause the detector to report absence of unusual behavior in the photovoltaic system.

12. The method of claim 11, wherein output of the subset of the photovoltaic panels is turned off for a predetermined period of time in accordance with communications between the computing apparatus and the controllers; and the detecting results of the detector during the predetermined period of time are used to infer the location of the unusual behavior.

13. The method of claim 10, wherein the changes in the operations of the photovoltaic panels include turning off output of the photovoltaic panels one at a time to identify a photovoltaic panel turning off which panel causes the detector to report a change in detection results in the photovoltaic system.

14. The method of claim 13, wherein the identifying of the location includes inferring the location of the unusual behavior based on the change in detection results in the photovoltaic system.

15. The method of claim 10, wherein the changes in the operations of the photovoltaic panels include turning off output of the photovoltaic panels one subset at a time; and the identifying of the location includes inferring the location of the unusual behavior based on correlations between the changes in the detection results of the detector and the changes in the operations of the photovoltaic panels.

16. The method of claim 10, further comprising:
detecting, by the detector, the unusual behavior based on a signal in a set of wires in the photovoltaic system, wherein the signal corresponds to one or more of a voltage change and a frequency spectrum change.

17. The method of claim 16, wherein the unusual behavior is representative of broad band noise that accompanies an arc.

18. The method of claim 16, wherein the unusual behavior indicates presence of an arc.

19. An apparatus, comprising:
a computing apparatus in communication with controllers in a plurality of devices and in communication with a detector in a photovoltaic system having a plurality of photovoltaic panels controlled by the plurality of the devices,
wherein each respective device in the plurality of the devices has:
a switch to control output of electricity generated by a respective photovoltaic panel to which the respective device is locally coupled, and
a controller to transmit and receive information; and
wherein in response to the detector detecting presence of unusual behavior in the photovoltaic system, the computing apparatus communicates with the controllers to change operations of the photovoltaic panels and identifies a location of the unusual behavior within the photovoltaic system based on responses of the detector as results of changes in the operations of the photovoltaic panels.

20. The apparatus of claim 19, wherein the changes in the operations of the photovoltaic panels include turning off, for a predetermined period of time, output of the photovoltaic panels one subset at a time to identify changes in detecting results of the detector caused by turning off output of one or more subsets of the photovoltaic panels.

* * * * *